Jan. 13, 1953 — F. B. MOSER — 2,625,322
TRANSACTION COUNTER SELECTION AND CONTROL
Filed Oct. 30, 1948 — 3 Sheets-Sheet 1

Inventor
FRANK B. MOSER
By Earl Benst
His Attorney

Jan. 13, 1953  F. B. MOSER  2,625,322
TRANSACTION COUNTER SELECTION AND CONTROL
Filed Oct. 30, 1948  3 Sheets-Sheet 2
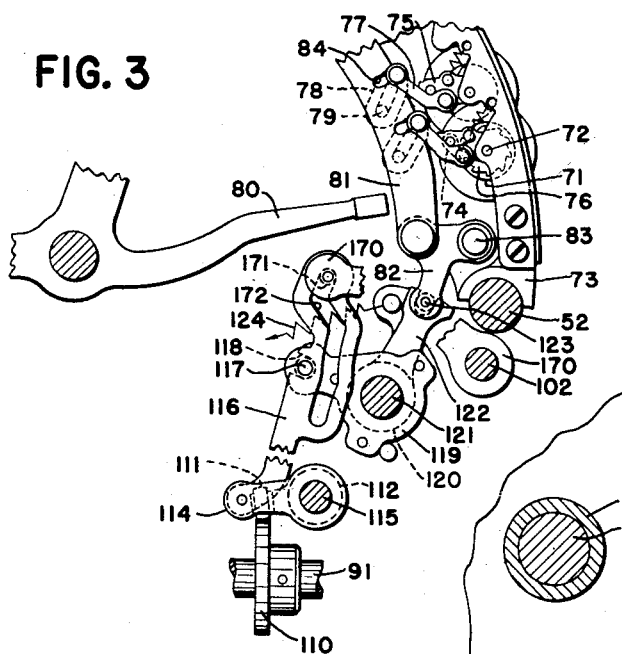
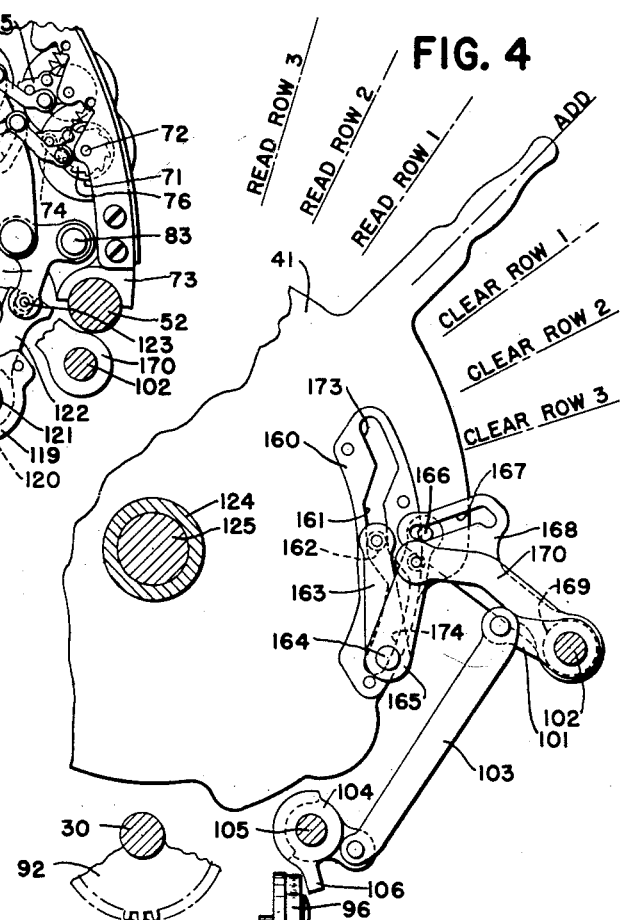
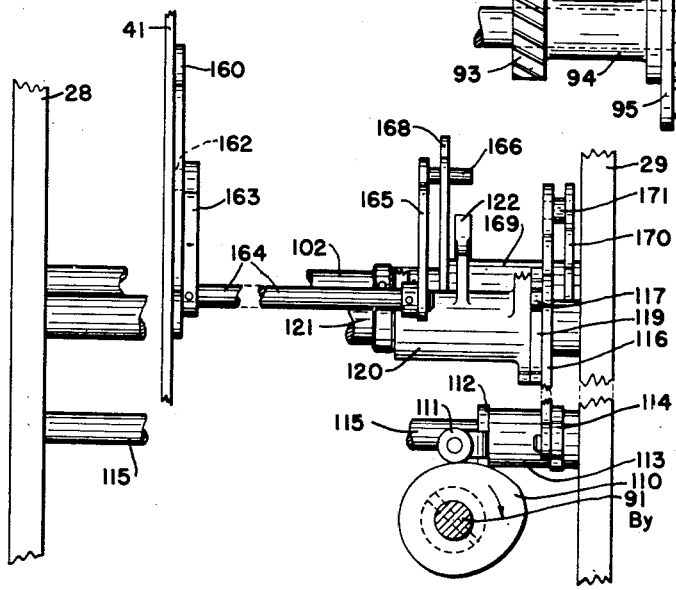
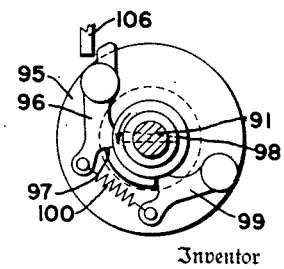
Inventor
FRANK B. MOSER
By Earl Beust
His Attorney

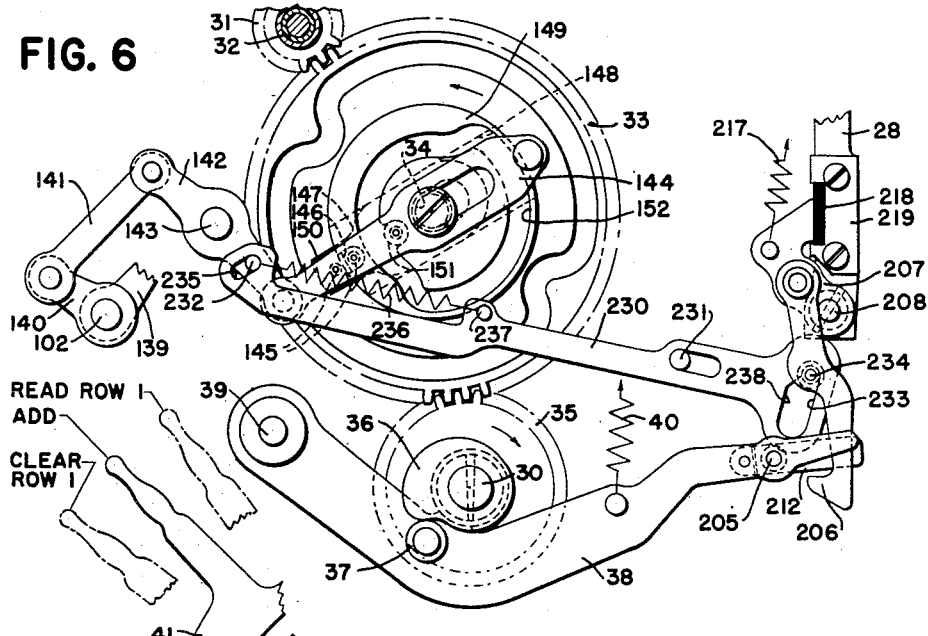
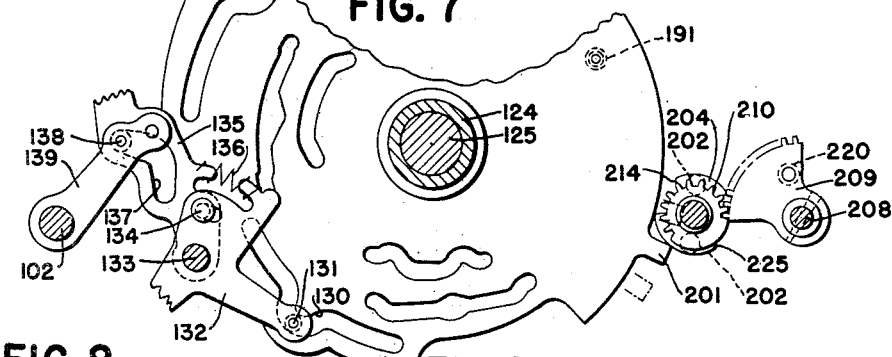
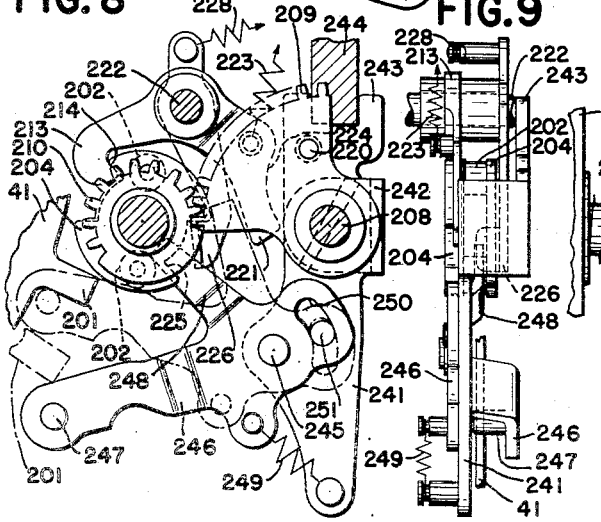
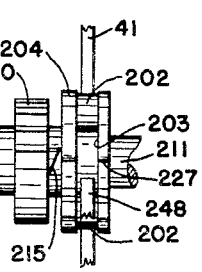

Patented Jan. 13, 1953

2,625,322

UNITED STATES PATENT OFFICE 2,625,322

TRANSACTION COUNTER SELECTION AND CONTROL

Frank B. Moser, Dayton, Ohio, assignor to The National Cash Register Company, Dayton, Ohio, a corporation of Maryland Application October 30, 1948, Serial No. 57,507

8 Claims. (Cl. 235—2)

This invention relates to cash registers and accounting machines and particularly to the type disclosed in Letters Patent of the United States No. 1,619,796, issued March 1, 1927, to B. M. Shipley. More particularly the invention is applied to a type of machine above mentioned wherein various types of itemized accounts or transactions are registered. In many instances, and particularly in States where sales tax laws are in force, it is necessary to determine the total of the several items which have been registered in connection with one particular transaction, so that the operator may then determine the amount of tax to be charged in connection with that transaction.

In machines of this type there is provided a listing key which is depressed and stays depressed during the entry of several items of any one particular transaction.

After all of the items of any multiple-item transaction have been entered, the total lever is then moved to the sub-total or read position and a reading operation is made to determine the total amount of the several items so that the operator may, from that amount, determine the amount of tax to be entered.

After the tax has been entered, then the total lever is moved to the first position below add position, which is the item total position, and the machine put through an operation, whereupon the complete amount of the transaction, that is the total of the items, and the amount of the tax are recorded and printed, showing how much the particular transaction amounted to.

In the past, and particularly as shown in the United State Letters Patent to Samuel Brand No. 1,736,067, issued November 19, 1929, there has been provided a mechanism which automatically restores the total lever from the total or first clear or reset position to an add position at the end of a total operation.

However, when the total lever is moved to the first position above add, which is the sub-total position, to take the sub-total of the several items to determine the amount of the tax to be charged, the operator was forced to return the total lever to its add position by hand.

Therefore, one of the objects of the present invention is to provide means for automatically returning the total lever from the item sub-total or "Read Row 1" position to the "Add" position, following the recording of the sub-total of the transaction being recorded.

Machines of this type are also provided with clerks-customer counters, which are adapted to count one for each complete transaction made by any one clerk.

Since a clerk's key is depressed at the beginning of a multiple-item transaction and remains depressed during the entry of each of the items of said multiple-item transaction, a particular clerk's counter is selected for each item entry operation, but in order to prevent such particular selected special counter from being operated during the entry of each of the several items of such multiple-item transaction, there is provided a special mechanism to control the operation of this particular clerk's counter.

It is, therefore, another object of the present invention to provide a novel mechanism to prevent adding in any of the special counters which are related to the clerks, while listing the several items of those multiple-item transactions which are being recorded in connection with any particular customer.

In other words, it is an object of this invention to so control the special counter operating mechanism that it will operate only when the total of the several items of the multiple-item transaction is recorded.

It is a still further object of the invention to so control the clerk's counter operating mechanism so that it will add when a single-item transaction is recorded in connection with any particular clerk.

A further object of the present invention is to provide novel means for controlling the special counter operating mechanism so that when the total lever is moved to any one of the three positions above the "Add" position, or in other words, to any one of the read or sub-total positions, the special counter mechanism will not operate, and furthermore the special counter mechanism will not operate when the total lever is moved to the second and third positions below the "Add" position, which are total positions for this total lever.

A still further object of the present invention is to provide novel means under control of the List key, which in turn controls mechanism for controlling the differential or latch mechanism for the clerk's row whenever the List key is depressed for the entry of the several items of a multiple-item transaction, to control the operation of the special counters so that they will be prevented from operating during the entry of the several items of a multiple-item transaction.

With these and incidental objects in view the invention consists of certain novel features of construction and combinations of parts, the essential elements of which are set forth in appended claims, and a preferred form or embodiment of which is hereinafter described with reference to the drawings which accompany and form a part of this specification.

Of said drawings:

Fig. 1 is a right side elevation partly broken away, showing the List key of row one and the clerks' keys of row 2, and also the mechanism controlled by the List key of row 1, for controlling the latch mechanism of row 2, to prevent adding in the special counters of row 2 during listing operations.

Fig. 3 is a left side elevation partly broken away, showing two of the clerks' special counters and the operating means therefor, and also a part of the control mechanism for controlling the effectivity of the operating means.

Fig. 4 shows a portion of the total lever and mechanism controlled thereby to control the special counter operating means and the means to control the operation of the shaft which actuates the special counter operating means.

Fig. 5 is a rear view of the special counter operating means.

Fig. 6 is a detail view of the driving mechanism for the machine and shows the mechanism for controlling the machine so that it will receive two cycles of operation during total-taking and during sub-total-taking operations, and also shows the means for positively insuring that the driving mechanism and the main cam shaft will be restored to normal position at the end of the operation, and in addition shows a part of the mechanism for restoring the total lever to its "Add" position from either the "Read Row 1" position or the "Clear Row 1" position.

Fig. 7 is a detail view of the total lever, partly broken away, with part of the mechanism operated thereby and a part of the automatic restoring means for said total lever.

Fig. 8 is an enlarged detail view of a part of the mechanism for restoring the total lever to its "Add" position from either the first position above or the first position below "Add."

Fig. 9 is a rear view of a portion of the mechanism shown in Fig. 7.

Fig. 10 is a rear view of other parts of the mechanism shown in Fig. 7.

Fig. 11 shows the driving means for the special counter operating means drive shaft.

GENERAL DESCRIPTION

As has been previously pointed out, this invention is adapted for use in connection with machines of the type shown in the Shipley Patent No. 1,619,796. Such machines are usually provided, in addition to the regular amount keys, with three rows of control keys and a total lever, the latter operable to control the machine for the various types of operations, such as adding, sub-totaling and totaling.

Figure 2:
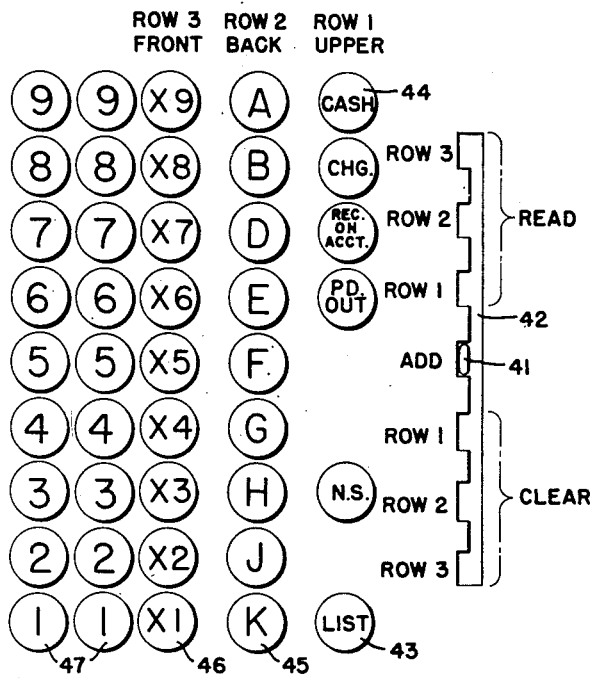
Fig. 2 is a diagrammatic view of a portion of the keyboard and also shows the total lever and the positions of adjustment thereof.

Associated with each row of control keys is a totalizer, as is fully illustrated and described in the above mentioned Shipley patent. In Fig. 2 of the present application there is shown a diagrammatic view of the control rows of keys and the total lever. These rows are numbered 1, 2 and 3, row 1 controlling totalizers on the upper totalizer line, row 2 controlling totalizers on the back totalizer line, and row 3 controlling totalizers on the front totalizer line.

In Fig. 2 of the present application the lowermost key of row 1 is designated "List." The other keys in this row may have captions to suit the business in which the machine is to be used. In row 2 all keys are marked with the captions A to K designating clerks' keys, and in row 3 these keys may carry any desired captions to suit the business, such as various departments or various types of merchandise.

As previously stated, this invention relates particularly to the special counters and mechanism for controlling the operation thereof, which special counters are associated, one with each of the clerks' keys of row 2. The machine is particularly adapted for the registering and recording of single-item transactions and multiple-item transactions. For a single-item transaction the operator, after setting up the amount of the transaction, depresses a key in row 3, one of the clerks' keys and one of the upper keys in row 1, designating, for example, the type of transaction, such as cash, charge or paid-out.

During this operation the total lever is in the add position, as shown diagrammatically in Fig. 2, and the machine goes through one cycle of operation to register and record the amount set up on the amount keys, and at the same time to count "1" in the special counter associated with the particular clerk's key which has been depressed. During multiple-item entry operations the List key at the bottom of row 1 is operated in conjunction with a key in row 3, and also a designated clerk's key in row 2. During the registration and recording of multiple items, it is desirable that the special counter associated with the clerk's key which has been operated does not function, or in other words, does not add "1" for the entry of each of the several items of a multiple-item transaction because the particular system being described is to have "1" added to each of the special counters associated with the clerks for each complete transaction, whether it be a single-item transaction or a multiple-item transaction.

Therefore, means is provided for controlling the operating mechanism for the special counters so as to disable it whenever the List key is depressed for the entry of a multiple-item transaction.

After the entry of the several items of a multiple-item transaction, the operator moves the total lever to the first position above "Add," which is the "Read Row 1" position, in order to take a reading or sub-total of the amount of money which has been entered and totaled for the several items of the transaction. This amount is indicated, whereupon the operator may from that amount determine the amount of tax to be charged for this multiple-item transaction. After the amount has been read and the machine released for this particular operation there is mechanism provided for automatically returning the total lever from the sub-total or "Read Row 1" position to the "Add" position, so that it is not necessary for the operator to move the total lever back to its adding position in order to set up the amount of tax and add that to the amount which is in the totalizer, which amount is the sum of the several items of the multiple-item transaction.

After the entry of the tax, which is a one-cycle or add operation, the operator then moves the total lever downwardly to the "Clear Row 1" position, which is the first position below "Add," and during such operation the totalizer is cleared to show the total amount of the transaction, that is the sum of the several items plus the amount of the tax chargeable thereagainst.

Also, after this operation the total lever is automatically returned upwardly to its normal or "Add" position, so that it is not necessary for the operator to do this manually.

There is mechanism associated with the total lever to control the special counter operating mechanism so as to disable the special counter mechanism whenever the total lever is moved upwardly into the "Read Row 1," "Read Row 2," or "Read Row 3" position, or whenever it is moved downwardly to the "Clear Row 2" or "Clear Row 3" position. In other words, whenever the total lever, for example, during a multiple-item operation, is moved to the "Read Row 1" position in order to find out how much the total of the several items amounts to, so that the tax may be added thereto, the special counter associated with the clerk who is performing this operation is not operated due to the fact that the total lever controls novel mechanism for disabling the special counter operating mechanism. However, when the total lever is moved to the "Clear Row 1" position, such novel mechanism is controlled so that it again enables the special counter operating mechanism, so that the clerk's counter associated with the clerk performing this operation will have "1" added thereto.

DETAILED DESCRIPTION

*Machine operating mechanism*

The machine is provided with a main cam shaft 30 (Fig. 6) supported by side frames 28 and 29 (Fig. 5). This shaft 30 receives one rotation in the direction of the arrow during each item entering operation and two rotations during each sub-total taking and each total-taking operation.

The cam shaft 30 may be rotated either by means of a motor, as described in the above-mentioned Shipley Patent No. 1,619,796, or by means of a crank (not shown) which is adapted to be clutched to a pinion 31 mounted to rotate on a hollow stud 32. The pinion 31 meshes with a gear 33 mounted on a stud 34. The gear 33 meshes with a gear 35 secured to the main cam shaft 30. Two rotations of the pinion 31 drive the gear 35 and the shaft 30 one complete rotation. During read or sub-total operations, and also during total taking operations the gear 35 and shaft 30 are given two complete rotations.

The reason for giving the shaft 30 two complete rotations during read or sub-total taking operations and also during total-taking operations is well known in the art and is described in full and also illustrated in the above-mentioned Shipley patent.

In order to insure the return of the machine to home position there is secured to the main cam shaft 30 a cam 36. This cam 36 cooperates with a roller 37 carried by an arm 38 pivoted at 39 to the machine frame 28 (Fig. 5). A strong spring 40 (Fig. 6) maintains the roller 37 always in contact with the cam 36. As the shaft 30 rotates, the cam 36 will stretch the spring 40 until, near the end of the rotation of the shaft 30 the roller 37 passes off the highest point of the cam 36, whereupon the spring 40 returns the arm 38 and cam 36 to normal, thus insuring the positive return of the main shaft 30 to its normal position.

*Keyboard*

The machine to illustrate the present invention is provided with total lever 41 (Fig. 2) operable in a slideway 42, in the machine cabinet (not shown) so that it can be moved into its various positions above and below the "Add" position. Such cabinet is provided with the usual hinged lids for openings to afford access to the various mechanisms by authorized persons when necessary. Such lids are provided with locks for protection of the mechanisms to prevent any tampering therewith.

There are also provided three rows of control keys and several rows of amount keys. The control rows are designated "row 1," "row 2" and "row 3." For example, in row 1 there is provided a "List" key 43 and several other keys, such as "Cash," "Charge," "Received-on-Account," "Paid-Out" and "No-Sale," all of which keys have been designated 44. Row 2 is comprised of a row of clerks' keys 45 and row 3 is comprised of department keys 46 designated X1 to X9. There may be several rows of amount keys 47, depending upon the capacity desired by the person using the machine.

Figure 1:
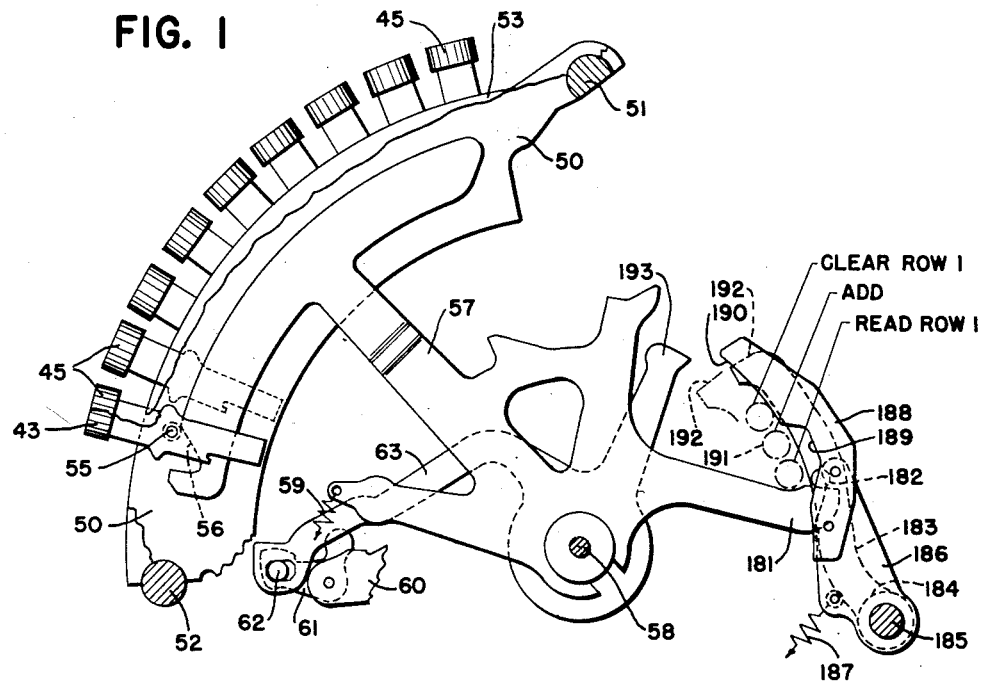

In Fig. 1 is shown the mounting of the List key 43 in row 1 and the clerks' keys 45 in row 2. The List key 43 and the remaining keys 44 in row 1 are mounted in a key frame 50, which in turn is mounted on cross rods 51 and 52 supported by the machine side frames 28 and 29.

The clerks' keys 45 are mounted in a key frame 53, which is supported by the cross rods 51 and 52 in the usual manner.

The mounting for the department keys 46 and the amount keys 47 is not shown herein, but such keys are also carried by frames similar to the frames 50 and 53, which in turn are supported on the cross rods 51 and 52, as is fully illustrated in the above-mentioned Shipley Patent No. 1,619,796.

The List key 43 (Fig. 1) carries a pin 55 co-operating with an inclined surface 56 of a lever 57 pivoted on the usual tie rod 58. The inclined surface 56 of the lever 57 is normally held in contact with the pin 55 by a spring 59. When the List key 43 is depressed the pin 55 rocks the lever 57 clockwise for a purpose which will be hereinafter described in connection with the control of the operating mechanism for the special counters.

Associated with the bank of clerks' keys 45 is the usual differentially adjustable arm 60 carrying the usual latch mechanism 61, having a pin 62 engaged by an arm 63, which is pivoted on the rod 58. This differential arm 60 is controlled by the clerks' keys which have been depressed so as to cause a differential setting of the arm 60 during the operation of the machine in a manner which is fully illustrated and described in the above-mentioned Shipley patent.

SPECIAL COUNTERS

This machine is provided with a plurality of special step by step counters, there being a separate counter appropriated to each of the clerks' keys 45; however, only two of such counters are shown, as viewed in Fig. 3.

In normal single-entry operations whenever one of the clerks' keys 45 is depressed its associated special counter is selected to have "1" added thereto to keep account of the number of transactions which are handled by that particular clerk.

However, during multiple-item operations it is desirable to have the associated special counter for the clerk handling the transaction operate only once and that being during the taking of the total of the several items of the multiple-item transaction.

Therefore, there is provided in connection with these special counters, special mechanism for controlling the effectivity of the driving mechanism for the operating mechanism of the special counters, so that during the entry of each of the items of a multiple-item transaction any selected special counter will not be operated, nor will it be operated during the operation when the clerk is taking a reading or sub-total operation to determine how much tax is to be charged against the total of this multiple-item transaction.

The type of counter used is well known and is fully illustrated and described in the United States patent to F. L. Fuller No. 1,394,256, issued on October 18, 1921, and reference may be had thereto for a specific detailed description of the same.

In view of the above-mentioned description, only a brief description of the counters will be given herein. Each of the special counters comprises a plurality of counter wheels 71 (Fig. 3) loosely mounted on a shaft 72 supported by a counter supporting frame 73 carried by the cross rods 51 and 52. The counters are adapted to be given a step by step movement by feeding pawls 74 mounted on pawl-carrying levers 75 pivotally supported by the shafts 72. The feeding pawls 74 cooperate with ratchets 76 which are secured to the side of the special counter wheels 71. The ratchets 76 and consequently the wheels 71 are given one step of movement by the pawls 74 to count "1" each time the pawl-carrying levers 75 are operated, in a manner to be hereafter described.

Pivoted to the feed pawl carrying levers 75 are links 77 which at their opposite ends are pivoted to slotted links 78 slidably mounted on pins 79 mounted in the counter frame 73.

Associated with the special counters 71 is a selecting arm 80 which is set differentially under the control of the clerks' keys 45, as is fully illustrated and described in the above-mentioned Fuller patent. In other words, when the "K" key 45 is depressed the selecting arm is moved to a position to select the lowermost of the two special counters shown in Fig. 3 and when the "J" key 45 is depressed the next counter above it is selected for operation.

There is associated with all of the special counters 71 an operating bar 81 pivoted at its lower end to a lever 82 which is pivoted at 83 on the frame 73. The upper end of the operating bar 81 is supported by a link (not shown) which is also pivoted to the frame 73. This operating bar 81 has a plurality of slots 84 cut therein to embrace the pins which form the pivotal point between the links 77 and the slotted links 78.

When the operating bar 81 is moved downwardly by mechanism, which will be later described, the pins in the ends of the links 77 will also be carried downwardly and the slotted links 78 will slide on their supporting pins 79 except that link 78 relatively to which the selecting arm 80 has been positioned in cooperative relation. When this occurs the sliding link 78 for the selected counter will contact the end of the selecting arm 80 and will be held against movement. This link 78 and its associated link 77 therefore will form a toggle which when straightened by the downward movement of the operating bar 81, will turn the pawl carrying lever 75 and rotate the units counter wheel 71 one step to add "1" to the selected counter.

OPERATING MECHANISM FOR SPECIAL COUNTER OPERATING BAR

The operating mechanism for the special counter operating bar 81 is driven from a shaft 91 (Figs. 3, 4 and 5) which receives its movement from the main cam shaft 30 in the following manner:

Secured to the main cam shaft 30 is a worm gear 92 meshing with a worm 93, which is secured by a sleeve 94 to a drive plate 95 (see also Fig. 11), the worm 93, sleeve 94, and plate 95 being loose on the shaft 91. The plate 95 has pivoted thereon a drive pawl 96 cooperating with a drive lug 97 secured to a collar 98 which is fastened to the shaft 91. When the shaft 30 is rotated the worm gear 92 drives the worm 93 and consequently the plate 95, whereupon the drive pawl 96 through its cooperation with the lug 97 drives the collar 98 and shaft 91 through one complete rotation for each rotation of the cam shaft 30. Such movement is counterclockwise in Fig. 11 and clockwise in Fig. 5.

To prevent retrograde movement of the shaft 91 there is a retaining pawl 99 cooperating with the other shoulder of the lug 97. This pawl 99 is connected by a spring 100 to the drive pawl 96.

This shaft 91 is given one complete rotation during adding operations for each rotation of the cam shaft 30 which, as above mentioned, makes one rotation during adding operations.

However, during total-taking operations the cam shaft 30 makes two complete rotations but it is desirable to prevent operation of the shaft 91 during the first rotation of the shaft 30 during all total and sub-total operations, and consequently there is provided a means which is operable under control of the total lever 41 for preventing operation of the shaft 91 during the first cycle of a totaling operation.

This mechanism (Figs. 4 and 11) includes an arm 101 fast upon a shaft 102, the operation of which will be hereinafter described. Pivoted to the arm 101 is a link 103 which is also pivoted to a casting arm 104 loosely mounted on a shaft 105 supported by the machine frames 28 and 29. The arm 104 has a finger 106 which, when the total lever 41 is operated to rock the shaft 102, rocks clockwise, and moves to the position shown in Fig. 11, in which it will cooperate with the tail of the drive pawl 96. When the finger 106 has been moved into the position shown in Fig. 11 and the shaft 30 begins its first rotation during total or sub-total operations, the rotation of the plate 95 will cause the tail of the pawl 96 to engage the finger 106 and to rock the pawl clockwise, thus disengaging its nose from the lug 97 so that it will ride upon the outer periphery thereof and will not drive the collar 98 and consequently will not drive the shaft 91 during the first rotation of the cam shaft 30 during total or sub-total operations.

At the completion of the first operation or rotation of the plate 95, the drive pawl 96 will return to the home position shown in Fig. 11 and consequently when the shaft 30 is rotated a second time during the total or sub-total operation the finger 106 will have been moved away from the tail of the pawl 96, and therefore the pawl will drive the shaft 91 during the second rotation of the shaft 30.

Secured to the shaft 91 is a cam 110 (Figs. 3 and 5) cooperating with a roller 111 carried by an arm 112, which is secured by a sleeve 113 to an arm 114 pivoted on a shaft 115 carried by the machine side frames 28 and 29.

This arm 114 is pivoted to a link 116 carrying a stud 117 projecting into a notch 118 of an arm 119 secured to a flanged sleeve 120 which is loosely mounted on a shaft 121 carried by the machine side frames 28 and 29. Integral with the sleeve 120 is an arm 122 having a slot into which projects a pin 123 carried by the lever 82, which has been previously described. A spring 124 normally holds the parts in the positions shown in Fig. 3, wherein the roller 111 is held against the cam 110 and the operating bar 81 is held in the position shown in this figure.

As the cam 110 is rotated by the shaft 91 the roller 111 is raised, consequently rocking the arms 112 and 114, which raises the link 116 and through the pin 117 rocks the arms 119 and 122 clockwise, thus rocking the lever 82 counterclockwise and lowering the operating bar 81 in the manner above described so as to operate the links 78 and 77 to actuate the pawl 74 to operate the associated special counter wheel 71 to count "1," the links 78 and 77 operated, being the ones opposite the selected position of the selecting arm 80 under control of the clerk's key 45 which has been depressed. From the above description it will be perfectly clear that during the entry of each single-item transaction, which is a regular normal adding operation, the selected special counter 71 will be actuated to count "1" so that the clerk who handled the transaction will be given credit for that one particular transaction.

It will also be clear that during the first cycle or first rotation of the cam shaft 30 during each read or sub-total operation and also during each clear or reset operation the shaft 91 (Fig. 3) is prevented from rotating and consequently the lever 82 is not moved counterclockwise by the intermediate mechanism shown in Fig. 3, and therefore there will be no actuation of the selected clerk's special counter during such first cycle of a sub-total or total-taking operation.

Whenever the total lever 41 is moved to the "Read Row 1" position, "Read Row 2" position, "Read Row 3" position, or "Clear Row 2" position or "Clear Row 3" position, it is necessary to disable the operating mechanism for the special counter operating bar so that during such operations any selected clerk's counter will not be operated. Such mechanism will now be described with particular reference to Figs. 3, 4 and 5.

The total control lever 41 is pivoted on a sleeve 124 mounted on a stud 125 in a well known manner, which is fully illustrated and described in the above-mentioned Shipley and Fuller patents.

First will be described the mechanism for rocking the shaft 102 (Figs. 3, 4 and 7). The shaft 102 is given two movements, one directly by the movement of the total lever out of its add position in either direction, and a still further movement by means to be later described.

The movement of the shaft 102 is counterclockwise, as viewed in Figs. 3 and 4, and clockwise as viewed in Figs. 6 and 7.

As shown in Fig. 7, the total lever 41 is provided with a cam slot 130, into which projects a stud 131 of a lever 132 pivoted on a stud 133 carried by the side frame 28. This lever 132 is connected by a pin and slot connection 134 to an arm 135, also pivoted on the stud 133. The arm 135 is adapted to be driven by a spring 136 compressed between fingers on the lever 132 and the arm 135. The arm 135 has a cam slot 137 into which projects a stud 138 on an arm 139, which is secured to the shaft 102.

Also secured to the shaft 102 is an arm 140 (Fig. 6) connected by a link 141 to a lever 142 pivoted on a stud 143. Also pivoted to the lever 142 is one end of a pitman 144 which is slidably mounted on the previously described stud 34.

The pitman 144 has two studs 145 between which an upwardly extending flange 146 of a coupler 147 projects. This coupler is adapted to slide in a slot 148 in the back of a cam 149, which is pivoted on the stud 34.

Movement of the total lever 41 out of its "Add" position in either direction, through the cam slot 130, lever 132, arm 135, and cam slot 137, rocks the arm 139 and consequently the shaft 102 slightly in a clockwise direction, as viewed in Figs. 6 and 7, thus moving the lever 142 clockwise which draws the pitman 144 toward the left and moves the narrow portion of the coupler 147 into a slot 150 in the drive gear 33 to couple the cam 149 to the gear.

The pitman 144 carries a roller 151 which projects into a notch in the cam 149 when the total lever 41 is in its normal "Add" position, but which is moved into a cam race 152 of the cam 149 when the total lever is moved in either direction out of its "Add" position, as described.

This cam race 152 is so timed that near the end of the first rotation of the shaft 30 the pitman 144 will be slid or moved still further toward the left as viewed in Fig. 6 thus giving the lever 142 an additional clockwise movement.

This additional movement of the lever 142 through the link 141 and arm 140 rocks the shaft 102 still further in a clockwise direction as viewed in Figs. 6 and 7 and counter-clockwise as viewed in Figs. 3 and 4. Thus the arm 101, previously described, during this extra movement of the shaft 102, is moved far enough to move the finger 106 out of the path of the tail of the drive pawl 96 so as to prevent disengagement of the pawl 96 from the lug 97 during the second cycle or second operation of the shaft 30 during a total or sub-total operation.

Control of special counter operating bar operating means directly by total lever During the entry of single-item transactions when the total lever is in the "Add" position, and during the clearing of row 1, which is the total of the several items of a multiple-item transaction, are the only two times that it is desirable to have the special counters 71 operate, and therefore, when the total lever is moved to any one of the three positions above add position, and also when it is moved to the second and third positions below the "Add" position, it directly operates mechanism to render the special counter operating bar operating mechanism ineffective. Such mechanism will now be described with particular reference to Figs. 3 and 4.

Secured to the side of the total lever 41 is a cam plate 160 having a cam slot, a portion 161 of which is concentric with the pivot point of the lever 41. Engaging this portion 161 of the cam slot is a stud 162 on an arm 163, secured to a shaft 164, which is supported by a part of the machine frame (not shown).

Also secured to the shaft 164 is an arm 165 having a pin 166 projecting into a cam slot 167 of an arm 168 secured to a sleeve 169 which is pivoted on the shaft 102. Also secured to the sleeve 169 is an arm 170 carrying a pin 171 projecting into a cam slot 172 of the previously described link 116.

When the total lever is in the "Add" position, as shown in Fig. 4, the stud 162 remains in the concentric portion 161 of the slot in the plate 160. When the lever 41 is moved to the "Clear Row 1" position which is the position into which it is moved to take the total of the items of a multiple-item transaction, the plate 160 is moved downwardly but the stud 162 remains in the concentric portion 161 of the cam slot and consequently there is no movement of the arm 163 or of the arms 168 or 170, and therefore the link 116 remains in the position shown in Fig. 3 wherein its pin 117 is in engagement with the slot 118 in the arm 119 so that this arm and the arm 122 to which it is connected may be rocked clockwise to operate the special counter operating bar 81 in the manner previously described.

However, when the total lever is moved to the "Clear Row 2" or the "Clear Row 3" position the plate 160 is moved downwardly to such an extent that a portion 173 of the cam slot, through the stud 162, rocks the arm 163 and shaft 164 and arm 165 in a clockwise direction, which causes the pin 166 to move the arms 168 and 170 counter-clockwise, whereupon the pin 171, through the cam slot 172 rocks the lever 116 counter-clockwise (Fig. 3) about its pivot point on the arm 114, thus disengaging the stud 117 from the slot 118 in the arm 119, and consequently the upward movement of the link 116 by the cam 110 in the manner previously described will be an idle movement, the slot 172 being of sufficient length for such movement without moving the arm 170 and consequently there will be no movement of the arm 119 or the arm 122, and therefore there will be no downward movement of the special counter operating bar 81 during such operations.

When the total lever is moved to the "Read Row 1," "Read Row 2" or the "Read Row 3" position, the plate 160 is moved upwardly and a portion 174 of the cam slot in the plate 160 engages the stud 162 and moves the arm 163 and arm 165 clockwise in the manner previously described, whereupon the pin 166 moves the arm 168 and arm 170 counter-clockwise to rock the link 116 counter-clockwise to disengage the stud 117 from the slot 118 of the arm 119 and consequently when the total lever is moved to any one of its three positions above the Add position, the connection between the link 116 and the arm 119 is broken, and, therefore, the special counter operating bar 81 cannot be operated when the link 116 is moved upwardly during such operations.

When the total lever 41 is restored to its "Add" position from any of the above three positions above "Add" and also from any of its two lower positions below "Add," all parts are restored to their normal positions shown in Figs. 3 and 4.

As earlier pointed out, it is desirable and necessary to prevent operation of the clerk's special counter which is associated with the clerk's key depressed during the entry of each of the several items of a multiple-item transaction, and to accomplish this the following mechanism is provided.

Referring to Fig. 1 it will be recalled that whenever the List key 43 is depressed for the entry of the several items of a multiple-item transaction its pin 55 rocks the lever 57 clockwise and holds it in this position until the sub-total of the several items is taken. This lever 57 has a rearwardly projecting integral arm 181 normally contacting a pin 182 carried by an arm 183 secured to a hub 184 which is loose on a shaft 185 supported by the machine side frames 28 and 29. Also secured to the hub 184 is an arm 186. A spring 187 maintains the pin 182 normally in contact with the arm 181. Secured to the arm 186 is a plate 188 having a notch 189 and a surface 190 which is, when the parts are in their normal positions as shown in Fig. 1, concentric with the center of the rod 58. This rod 58 is in axial alinement with the stud 125 (Fig. 7) upon which the total lever 41 is mounted. The total lever 41 carries a stud 191 (Fig. 7) shown in three positions in dot and dash lines in Fig. 1, which three positions are marked "Add," "Clear Row 1," and "Read Row 1."

When the List key 43 is depressed and the lever 57 rocked clockwise thereby, the arm 181 of said lever is moved downwardly whereupon the spring 187 rocks the arms 186 and 183 counter-clockwise, causing the pin 182 to follow the arm 181. At the same time the notch 189 engages the stud 191 of the total lever which during the listing of the items of a multiple-item transaction is in its Add position, and consequently the upper end 192 of the arm 183 is moved into the dot and dash line position of Fig. 1, which is in the path of movement of an arm 193 integral with the arm 63, which is connected to the latch of the differential arm 60, which is associated with the clerk's bank of keys. Therefore, when the machine is operated the arm 193 contacts the end 192 of the arm 183 causing the arm 63 to stop in the zero position, consequently causing the differential arm 60 and the associated selecting arm 80 to stop in this position so that the clerk's special counter associated with the key which has been depressed is not selected during the entry of the items of a multiple-item transaction. Therefore even though the operating mechanism is operated during the entry of the several items of a multiple-item transaction, the special counter associated with the clerk, not being selected, will not be actuated.

This condition also exists when the total lever is moved into the "Read Row 1" position, which is the position in which the sub-total of the several items of a multiple-item transaction are taken, as has been previously described. The notch 189 is of sufficient width to engage the stud 191 when the lever 41 has been moved to its "Read Row 1" position, as shown in Fig. 1, and therefore the end 192 of the arm 183 will be moved in the path of the arm 193 on the arm 63 to cause the latch to be disconnected from the differential arm 60 in the zero position so that even in the sub-total operation the clerk's special counter will not be selected.

However, when the total is taken of the several items of the multiple-item transaction the total lever 41 is moved to its "Clear Row 1" position, and the stud 191 (Fig. 1) is moved into the "Clear Row 1" position shown, it moves the plate 188 until said stud 191 contacts the surface 190 on the plate 188 and consequently moving the end 192 of the arm 186 out of the path of movement of the arm 193 on the differential arm 63.

Therefore, during the taking of the total of the several items of a multiple-item transaction the differential arm 60 is moved upwardly until it is positioned in accordance with the clerk's key which has been depressed, and consequently the clerk's special counter will be selected during the first cycle of this operation and "1" will be added to that selected counter during the second cycle of this total operation so as to count "1" to give the clerk credit for having handled a multiple-item transaction.

*Automatic restoring of total lever from "Clear Row 1" position to the "Add" position*

After taking the final total of the items of a multiple-item transaction plus the amount of tax thereon, the total lever 41 is automatically restored from the "Clear Row 1" position to the "Add" position. This mechanism is illustrated in Figs. 6 to 10.

The total lever 41 is provided with a rearwardly projecting lug 201 adapted to be moved upwardly (Fig. 7) into the path of one of two rollers 202, when the total lever is moved into its first position below its "Add" position which is the "Clear Row 1" position. The rollers 202 are mounted within an annular groove 203 (Fig. 10) of a collar 204. The collar 204 is rotated during total-taking operations for causing one of the rollers 202 to engage the lug 201 to restore the total lever 41 from its "Clear Row 1" position to its "Add" position.

The collar 204 is rotated by mechanism actuated by the arm 38 (Fig. 6), previously described, which carries the roller 37, which is held in contact with the cam 36 on the main cam shaft 30 by the strong spring 40. Mounted on the rear of the arm 38 is a stud 205 which is adapted to be engaged by a downwardly extending hook 206 pivoted on an arm 207 secured to a short shaft 208. Also secured to the shaft 208 is a segment 209 (Figs. 7 and 8) which meshes with a partial gear 210 loosely mounted on a shaft 211, upon which the collar 204 is also mounted.

During the latter part of the first cycle of a total-taking operation the hook 206 is rocked to the left into the path of the stud 205. A guide 212 is secured to the arm 38 and also supports the stud 205. The guide 212 and the rear end of the arm 38 act as a means for guiding the hook 206 into proper position to be engaged by the stud 205. When the arm 38 is lowered by the cam 36 during the latter part of the operation of the machine, the stud 205 is lowered and by its contact with the hook 206 the segment 209 is rocked counter-clockwise, and it in turn rotates the partial gear 210 in a clockwise direction (Figs. 7 and 8).

During this clockwise movement of the partial gear 210 the collar 204 is held against rotation by a flanged latch 226, which engages a shoulder 227 (Figs. 9 and 10) in one of the flanges of the collar 204. This latch 226 is pivoted on a rod 222 and is held in contact with the shoulder 227 by a spring 228. The gear 210 is permitted to rotate independently of the collar 204 due to a clutch connection (Fig. 10) which is provided with a cam edge 215 on each of the clutch prongs. As the gear 210 rotates the cam edges 215 will cause the gear 210 to be shifted toward the left (Fig. 10) against the tension of a spring 216 until said gear is disconnected from the collar 204.

The downward movement of the hook 206 will drive the gear 210 through one-half of a rotation in a clockwise direction. At the end of this one-half rotation the spring 216 shifts the gear 210 toward the right (Fig. 10) to reengage the clutch prongs with the clutch slots of the collar 204.

The downward movement of the hook 206 will also stretch a strong spring 217 (Fig. 6) attached to the upper end of the arm 207. The spring 217 normally holds the arm 207 against a resilient bumper plate 218 carried in a block 219 supported by the machine side frame 28. Just as the machine comes to rest and the total lever 41 is free to be moved back to its add position in a manner to be hereinafter described, the spring 217 rotates the segment 209 in a clockwise direction thereby rotating the gear 210 and the collar 204 in a counter-clockwise direction. During this counterclockwise movement of the collar 204 one of the rollers 202 engages the lug 201 of the total lever 41 and restores the lever from its "Clear Row 1" position to its "Add" position.

Before the collar 204 can be rotated in a counter-clockwise position, as just described, it is necessary, to disengage a latch 213 from a wall 214 of a notch in the flange of the collar 204. This latch 213 is pivoted on a rod 222. Mounted on the segment 209 is a stud 220 (Fig. 8) which near the end of the counter-clockwise movement of the segment 209 engages an arm 221 of the latch 213 thereby rotating the latch against the tension of a spring 223. The arm 221 of the latch 213 is provided with a surface 224 long enough to maintain the latch 213 disengaged from the wall 214 of the notch until the periphery of the flange of the collar 204 passes the nose of the latch 213. Just as the collar 204 completes its one-half rotation, the latch 213 will be engaged with the diametrically opposite shoulder 225 of a notch in the flange of the collar 204, under the action of the spring 223, thereby preventing further rotation of said collar 204. During the first cycle of a total-taking operation, the hook 206 is held in a position in which it is prevented from engaging the stud 205 by means of a link 230 slidably mounted on studs 231 and 232. The stud 231 is mounted on one of the machine frames and the stud 232 is carried by the previously described lever 142. The right-hand end of the link 230 is provided with a slot 233, the upper narrow portion of which normally engages a stud 234 carried by the hook 206. When the total lever 41 is moved into any of its total-taking positions the hook 206 is given a slight movement toward the left, but this movement is not enough to engage it with the stud 205.

This initial movement is given to the hook 206 upon the manual movement of the total lever 41 by means of the mechanism shown in the left of Fig. 7, which has been previously described, which mechanism rocks the shaft 102 and the arm 140 clockwise, thus rocking the lever 142 in a clockwise direction. The link 230 is provided with a slot 235, the upper end of which normally engages the stud 232, and is held in engagement therewith by a spring 236 stretched between the stud 232 and a stud 237 on the link 230.

Movement of the total lever 41 out of "Add" position, it will be remembered, rocks the lever 142 clockwise, which, assisted by the spring 236, moves the link 230 toward the left as viewed in Fig. 6.

Near the end of the first cycle of operation the link 230 is given an additional movement toward the left by the cam 149 when it rocks the lever 142 in the manner previously described.

The timing of the cam race 152, which has been previously described, and which moves the pitman 144 to rock the lever 142, is such that near the end of the first rotation of the cam shaft 30 the pitman 144 will be slid still further toward the left (Fig. 6) thereby giving the lever 142 an additional clockwise movement.

Just before the cam race 152 moves the pitman 144 toward the left, the cam 36 moves the arm 38 to its lowermost position. After the arm 38 has thus been lowered the cam race 152 causes the lever 142 to be rocked in a clockwise direction as just described, which movement is sufficient to permit the link 230 to be moved to the left to cause the hook 206 to be moved into the path of the stud 205 but above said stud.

At the end of the first rotation of the shaft 30 the strong spring 49 raises the arm 38 and as the arm is raised the stud 205 will cam the hook 206 and link 230 toward the right against the tension of the spring 236. After the stud 205 has passed the hook the spring 236 moves the link 230 and the hook 206 toward the left thereby moving the hook beneath the stud 205.

Near the end of the second rotation of the shaft 30 the arm 38 is again lowered, thereby lowering the hook 206 to rotate the gear 210 in a clockwise direction as before described. At the very end of the second cycle of the operation of the shaft 30 the spring 40 again raises the arm 38, thereby moving the stud 205 upward and away from the hook 206.

The total lever 41 cannot be returned to its add position until the machine has reached its home position. For this reason the hook 206 cannot follow the arm 38 to its normal position when said arm is raised by the spring 40 near the end of the second cycle of the operation of the machine. However, the hook 206 can follow for a short distance until the roller 202 engages the lug 201 on the total lever 41, whereupon it will be prevented from moving because at this time the total lever 41 cannot be moved.

When the cam 149 reaches its home position and the roller 151 is in position to again engage the notch in the cam 149 as shown in Fig. 6 the pitman 144 will be free to be moved toward the right thereby permitting the counter-clockwise rotation of the lever 142. This will permit the spring 217 to complete the counter-clockwise rotation of the collar 204, thereby causing the total lever 41 to be returned to its "Add" position by the roller 202. However, this movement will not take place until the shaft 102 is free to be moved by the cam slot 130 in the total lever 41. Thus when the roller 151 moves into the notch in the cam 149 the shaft 102 will be free to move, and therefore the cam slot 130 can rock the shaft 102, thereby permitting the total lever 41 to be returned to its "Add" position.

Movement of the lever 142 when the total lever is returned to its "Add" position causes the link 230 to be moved toward the right, and for this reason the lower portion of the slot 233 is widened as at 238 so that even though the link 230 shall have been moved toward the right from the position shown, the stud 234 will be cammed into the upper small portion of the notch 233 by means of the spring 217.

From the above description it will be clear that after the end of the operation of the total of the several items of a multiple-item transaction, plus the amount of tax on those items, the total lever will be automatically returned to its normal position.

*Automatic return of the total lever from the "Read Row 1" position to its "Add" position*

In order to avoid the necessity for the operator having to manually restore the total lever from the "Read Row 1" position after having taken a sub-total of the several items of a multiple-item transaction, to determine the amount of tax to be charged against the total of these items, there is provided a novel mechanism for automatically restoring the total lever from this sub-total or "Read Row 1" position back into its adding position.

In order to accomplish this, the mechanism used to automatically restore the total lever from the "Clear Row 1" position to its "Add" position, and which has just been above described, is utilized in conjunction with the following described new mechanism.

Mounted on the shaft 208 (Fig. 8) is an arm 241, connected by a bail 242 to an arm 243, which is also mounted on the shaft 208. The arm 243 is notched to engage a machine frame 244 to hold the arm 243, bail 242 and arm 241 in a rigid position on the shaft 208.

Pivoted on a stud 245 carried by the arm 241 is a lever 246 carrying a pin 247 adapted to cooperate with the underside of the lug 201, on the rear of the total lever 41. Integral with the lever 246 is a finger 248, bent over to lie in the path of the rollers 202, which are carried between the flanges of the collar 204. A spring 249 holds the finger 248 normally adjacent one of the rollers 202, as shown in Fig. 8. The lever 246 is provided with a slot 250, which is concentric with the center of the stud 245. Projecting into this slot 250 is a pin 251 carried by the arm 241. The bottom edge of this slot acts as a stop for the lever 246 against the action of its spring 249, so that it will remain in the normal position shown in Fig. 8, and not bear against the roller 202.

When describing how the total lever 41 was returned to its normal position from the first position below "Add," or in other words, the "Clear Row 1" position, it was described how one of the rollers 202, by its engagement with the upper side of the lug 201 restored the lever 41 to its "Add" position.

During a sub-total operation the segment 209 operates the partial pinion 210 in exactly the same manner as it does during a total operation, which has been above described. Consequently the collar 204 and rollers 202 operate in identically the same manner and at identically the same time during sub-total operations when the total lever 41 is moved to its first position above "Add," which is the "Read Row 1" position.

Therefore, during the last half of the second cycle of the sub-total operation, or practically at the very end of said second cycle, the collar 204 is rotated counter-clockwise by the spring 217 (Fig. 6) in the manner above described.

When this occurs one of the rollers 202 by its engagement with the finger 248 of the lever 246 rocks said lever clockwise, as viewed in Fig. 8, against the tension of the spring 249 a sufficient distance to cause the pin 247 to contact the underside of the lug 201 on the total lever 41 and rock said total lever counter-clockwise to its normal position, this being from the "Read Row 1" position to the "Add" position, after the completion of a sub-total operation.

Therefore, by means of the present invention the total lever 41 is not only restored from the "Clear Row 1" position to its "Add" position, automatically, but it is also automatically restored to its "Add" position from its "Read Row 1" position which, as above described, is the sub-total position to which the operator moves the total lever 41 after having entered several items of a multiple-item transaction in order to determine how much tax is to be charged against the total of those items before taking the final total, which is taken when the total lever is moved into the "Clear Row 1" position, which total, of course, includes the sums of all of the items of the multiple-item transaction, plus the amount of tax which is charged to that amount.

Since the operation of the machine has been fully and clearly described in connection with the various detailed operations, it is not thought necessary to give any description of a complete operation at this point.

While the form of mechanism herein shown and described is admirably adapted to fulfill the objects primarily stated, it should be understood that it is not intended to confine the invention to the one form of embodiment herein disclosed, for it is susceptible of embodiment in various forms.

What is claimed is:

1. In a machine of the class described, adapted to record single-item transactions and multiple-item transactions and having a total lever having an "add" position, a sub-total taking position, and a total-taking position, a bank of clerks' keys and a differential mechanism associated with said clerks' keys, the combination of a plurality of special step-by-step counters, one associated with each of the keys in the clerks' bank; means actuated under control of the clerks' bank differential mechanism for selecting one of said counters for each single-item transaction, and also for selecting one of said counters for each of said multiple-item transactions; actuating means for said special counters; operating means for said actuating means; a special key means intermediate the total lever and said differential mechanism and controlled by said special key to prevent selection of any of said special counters during the entry of all of the items of a multiple-item transaction; a cam device secured to said total lever; a plurality of arms and levers operated by said cam devices; means connecting said arms and levers with said special counter operating means to render the latter ineffective upon movement of the cam device by said total lever when the total lever is moved into certain of its positions of adjustment; and a member carried by the total lever to operate a portion of said intermediate means upon movement of the total lever into total-taking position to render the remainder of said intermediate means ineffective, thus causing the differential mechanism to select a special counter during the taking of the total of the multiple items.

2. In a machine of the class described, the combination of a total lever having an "add" position, total-taking position, and a sub-total taking position, said lever adapted to be manually set into its total-taking position and into its sub-total taking position; a rotatable member adapted to cooperate with said lever for restoring it from its total-taking position to its "add" position; a normally inactive spring actuated device for rotating said member; means normally disconnected from said spring actuated device and operable during adding operations, sub-total taking operations and total taking operations and effective during sub-total taking operations to render said device active; means operating during sub-total-taking operations to connect said device to said normally disconnected means and to release said device from said normally disconnected means; and a lever device operable by said rotatable member to restore the total lever from its sub-total taking position to its add position under the action of said spring actuated device when the latter is rendered active.

3. In a machine of the class described, adapted to perform single-item entry operations and multiple-item entry operations, and having a total lever movable into positions to control the machine for taking totals and sub-totals of the items of a multiple-item transaction; the combination of a bank of clerks' keys; a bank of other control keys having therein one special key; a differential mechanism associated with said clerks' bank of keys; a plurality of special counters, one for each of said clerks' keys; actuating means for said special counters; operating means for driving said actuating means; means controlled by said differential mechanism for selecting any of said special counters according to the clerks' keys which has been depressed; a projecting member associated with and connected to said differential mechanism; means normally ineffective and under control of said special key and, when rendered effective, adapted to be moved into the path of said projecting member on the differential mechanism to prevent the selection of any of said special counters during entry of the items of a multiple-item transaction, and also during the taking of the sub-total of said items; means operable by said special key to render said normally ineffective means effective; means carried by said total lever to move said normally ineffective means from an effective position back to its ineffective position upon movement of the total lever into its item total taking position to cause the selection of the appropriate special counter; and means also operated by said total lever when it is moved into sub-total position for rendering the special counter actuating-operating means ineffective during the taking of a sub-total of the several items of the multiple-item transaction; and to again render the special counter actuating operating means effective to count "1" in the selected counter when said total lever is moved into position to take the total of the several items of a multiple-item transaction.

4. In a machine of the class described, the combination of a total lever having an add position, a total-taking position and a sub-total taking position, said lever being adapted to be manually set into its sub-total taking position and into its total-taking position; a rotatable member adapted to cooperate with said lever for restoring it from its total-taking position to its add position; a normally inactive spring for rotating said member; a normally disconnected operating means for rendering the spring active during total taking operations; mechanism operable by the lever when the lever is moved to its total-taking position to connect the spring with the operating means; a pivoted member; a projection on said member cooperating with said rotatable member; and another projection on said member cooperating with said total lever, to cause said lever to be restored to its normal adding position from its sub-total taking position under action of said spring when it is rendered active.

5. In a machine of the class described, the combination of a total control lever having an add position, a sub-total taking position, and a total taking position, said lever adapted to be set manually into its sub-total taking position and also into its total-taking position; a rotatable member; means carried by said member to cooperate with the total lever to restore the total lever to its adding position from its total-taking position; operating means to rotate said member; a member operable during adding operations and during sub-total and total taking operations of the machine; a projection on said operable member; a flexibly mounted device connected to said operating means and normally disconnected from said operable member; means projecting from said flexibly mounted device; means embracing said projecting means to connect said flexible device with the projection on the operable member during sub-total and total taking operations; guiding means on the operable member to prevent displacement of the flexible device; a pivoted member; a projection on said member cooperating with said rotatable member; another projection on said pivoted member cooperating with said total lever to engage and restore said total lever from its sub-total taking position into its adding position upon operation of said rotatable member.

6. In a machine of the class described, the combination of a total lever having an adding position, a sub-total taking position and a total-taking position, said lever adapted to be set manually into sub-total taking position and also into its total-taking position; means including a rotatable device carrying two members either of which is adapted to cooperate with the total lever to automatically restore said total lever from its total-taking position to its add position upon rotation of said device; and means including a rockable device adapted to cooperate with the total lever and operable by either one of said two members to automatically restore said total lever from its sub-total taking position into its add position.

7. In a machine of the class described, the combination of a total lever having an add position, a sub-total taking position and a total-taking position, said lever being adapted to be set manually into its sub-total taking position and also into its total-taking position; a member projecting from said total lever; means including a rotatable device to automatically restore said total lever from its total taking position to its add position by contacting one side of said projecting member on the total lever, and a rockable member controlled by said rotatable device for automatically restoring said total lever from its sub-total taking position to its add position upon contacting the opposite side of said projecting member on said total lever.

8. In a machine of the class described, the combination of a total control lever having an add position, a sub-total taking position and a total-taking position, said lever being adapted to be set manually to its total-taking position and also into sub-total taking position, said sub-total taking position and said total-taking position being in opposite directions from the normal adding position; and common means operable to automatically restore said total lever from its sub-total taking position into its add position, and also from its total-taking position into its add position, said common means including a rotatable member carrying means to contact said total lever when it has been moved into its total-taking position to restore it to its normal add position, and also including a pivoted member cooperating with said total lever and operable by said rotatable means to restore said total lever from its sub-total taking position into its add position.

FRANK B. MOSER.

REFERENCES CITED

The following references are of record in the file of this patent:

UNITED STATES PATENTS

| Number | Name | Date |
|---|---|---|
| 1,224,873 | Walter | May 1, 1917 |
| 1,394,256 | Fuller | Oct. 18, 1921 |
| 1,619,796 | Shipley | Mar. 1, 1927 |
| 1,736,067 | Brand | Nov. 19, 1929 |
| 1,839,371 | Brand | Jan. 5, 1932 |
| 1,865,147 | Shipley | June 28, 1932 |
| 1,874,368 | Shipley | Aug. 30, 1932 |
| 2,101,636 | Breitling et al. | Dec. 7, 1937 |
| 2,241,272 | Robertson | May 6, 1941 |